(12) United States Patent
Takakura (10) Patent No.: US 6,981,258 B1
(45) Date of Patent: Dec. 27, 2005

(54) PROCESS SCHEDULER WITHOUT LONG OVERHEAD AND LARGE MEMORY AND SCHEDULING METHOD USED THEREIN

(75) Inventor: Noriaki Takakura, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 665 days.

(21) Appl. No.: 09/691,838

(22) Filed: Oct. 18, 2000

(30) Foreign Application Priority Data

Oct. 19, 1999 (JP) .................................. 11-297134

(51) Int. Cl.⁷ ............................................. G06F 9/46
(52) U.S. Cl. ..................................... 718/102; 718/100
(58) Field of Search ................................. 718/100–108

(56) References Cited

U.S. PATENT DOCUMENTS

| | | | | |
|---|---|---|---|---|
| 5,379,428 A | * | 1/1995 | Belo | 718/103 |
| 6,108,683 A | * | 8/2000 | Kamada et al. | 718/103 |
| 6,148,325 A | | 11/2000 | Schmidt et al. | |
| 6,668,269 B1 | | 12/2003 | Kamada et al. | |
| 6,742,111 B2 | * | 5/2004 | Soni | 712/217 |

FOREIGN PATENT DOCUMENTS

| | | |
|---|---|---|
| JP | 63-261433 | 10/1988 |
| JP | 5-46413 | 2/1993 |
| JP | 6-309290 | 11/1994 |
| JP | 9-54699 | 2/1997 |
| JP | 9-502558 | 3/1997 |

OTHER PUBLICATIONS

Section 4.6 "Process Scheduling" of a book entitled as "Miracle of UNIX Kernel/Architecture of System V Release 4", pp. 156-185, Jan. 25, 1997.

* cited by examiner

*Primary Examiner*—Meng-Al T. An
*Assistant Examiner*—Kenneth Tang
(74) *Attorney, Agent, or Firm*—Foley & Lardner LLP (57) ABSTRACT

A process scheduling system has plural process schedulers respectively associated with plural user process groups each having at least one user process and selectively activated so as to search the associated user process groups for an executable user process, an administrator for managing the plural process schedulers, a process managing section respectively associated with the plural process schedulers for managing the plural user process groups, a selector cooperating with the administrator for selectively activating the plural process schedulers and informed of the executable user process and a process changer associated with the selector and changing a presently processed user process to the executable user process so that the overhead is decreased.

2 Claims, 6 Drawing Sheets

| INDEX | STARTING ADDRESS OF PROCESS SCHEDULER PROGRAM |
|---|---|
| 1 | PROCESS SCHEDULER A |
| 2 | PROCESS SCHEDULER B |
| 3 | FREE |
| 4 | FREE |

| INDEX | STARTING ADDRESS OF PROCESS SCHEDULER PROGRAM | USER PROCESS FLAG |
|---|---|---|
| 1 | PROCESS SCHEDULER A | 0 |
| 2 | PROCESS SCHEDULER B | 1 |
| 3 | FREE | FREE |
| 4 | FREE | FREE |

PROCESS SCHEDULER WITHOUT LONG OVERHEAD AND LARGE MEMORY AND SCHEDULING METHOD USED THEREIN

FIELD OF THE INVENTION

This invention relates to a scheduler incorporated in a computer system and, more particularly, to a process scheduler for prioritizing tasks and a scheduling method used therein.

DESCRIPTION OF THE RELATED ART

The process scheduler is implemented by a data processing system, and the scheduling method is provided in the form of a program. Plural scheduling policies are prepared in an operating system employed in the data processing system for scheduling processes or tasks. A process scheduler is disclosed in Japanese Patent Publication of Unexamined Application No. 9-54699, and is hereinbefore referred to as "first prior art". Another process scheduler is disclosed in Section 4.6 "Process Scheduling" of a book entitled as "Miracle of UNIX Kernel/Architecture of System V Release 4". The UNIX architecture is hereinbelow referred to as "second prior art".

The plural scheduling policies are prepared in a system in order to prioritize processes depending upon the urgency. When processes are to be scheduled in the system, the plural scheduling policies are required. The plural scheduling policies are required for a constant data processing at regular time intervals. The plural scheduling policies are, by way of example, employed in a multi-media system for assisting the time shared data processing. Similarly, the plural scheduling policies are employed in a process responsive to emergency prompt data processing such as a communication with another system.

The second prior art includes two classes, i.e., the real time class and the time sharing class. User processes to be processed in real time fashion are incorporated in the real time class, and the time sharing class were same as the class employed in the previous UNIX system. The two classes are separated depending upon the priority. If a user process has the priority higher than a criterion, the user process is scheduled in the real time class. On the other hand, when a process has the priority lower than the criterion, the process is scheduled in the time sharing class. A problem is encountered in the second prior art in that the second prior art does not guarantee the usage of the central processing unit through the user processes, and the first prior art was proposed as a solution of the problem.

Figure 1:
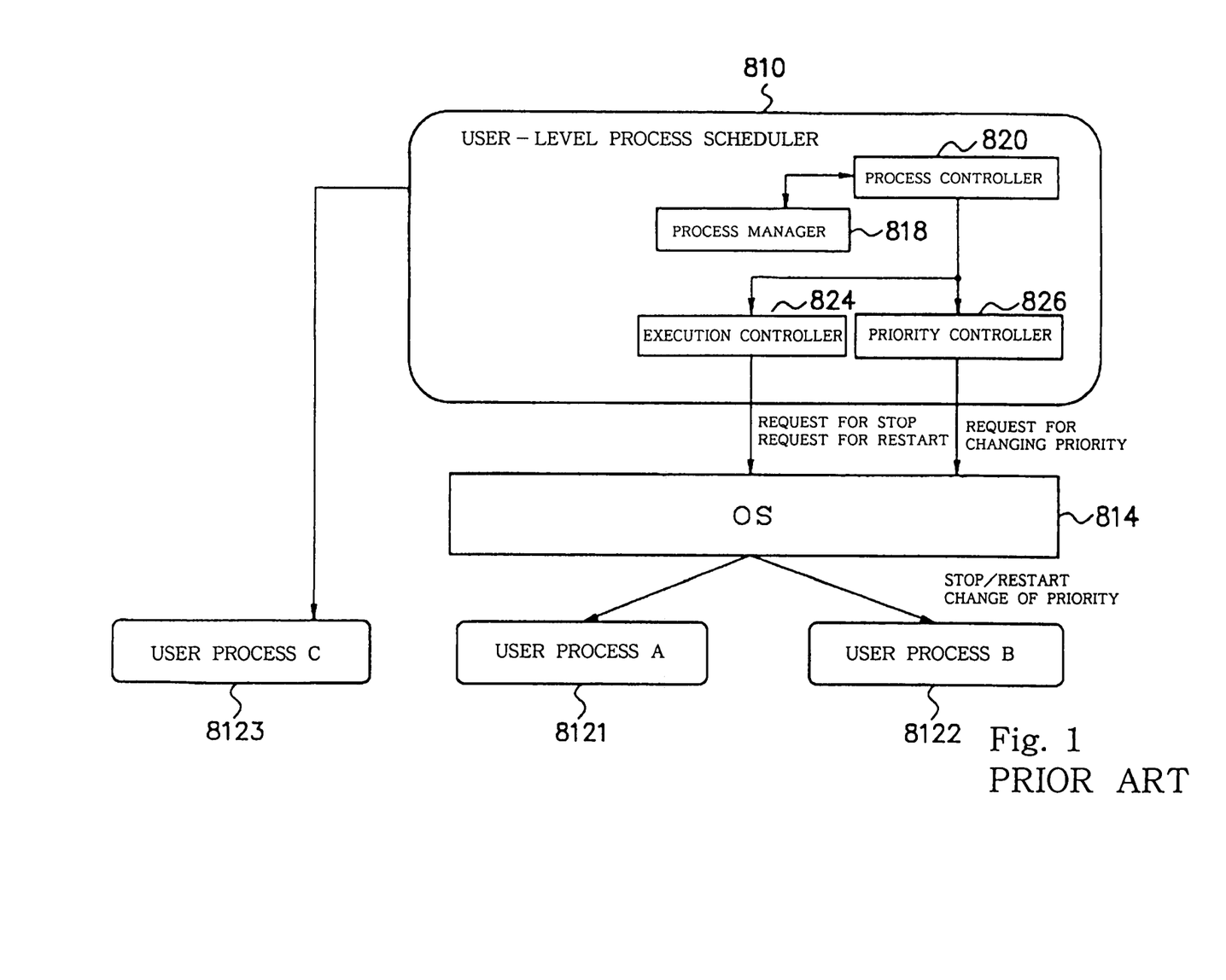
FIG. 1 is a block diagram showing the scheme of the first prior art.
Figure 2:
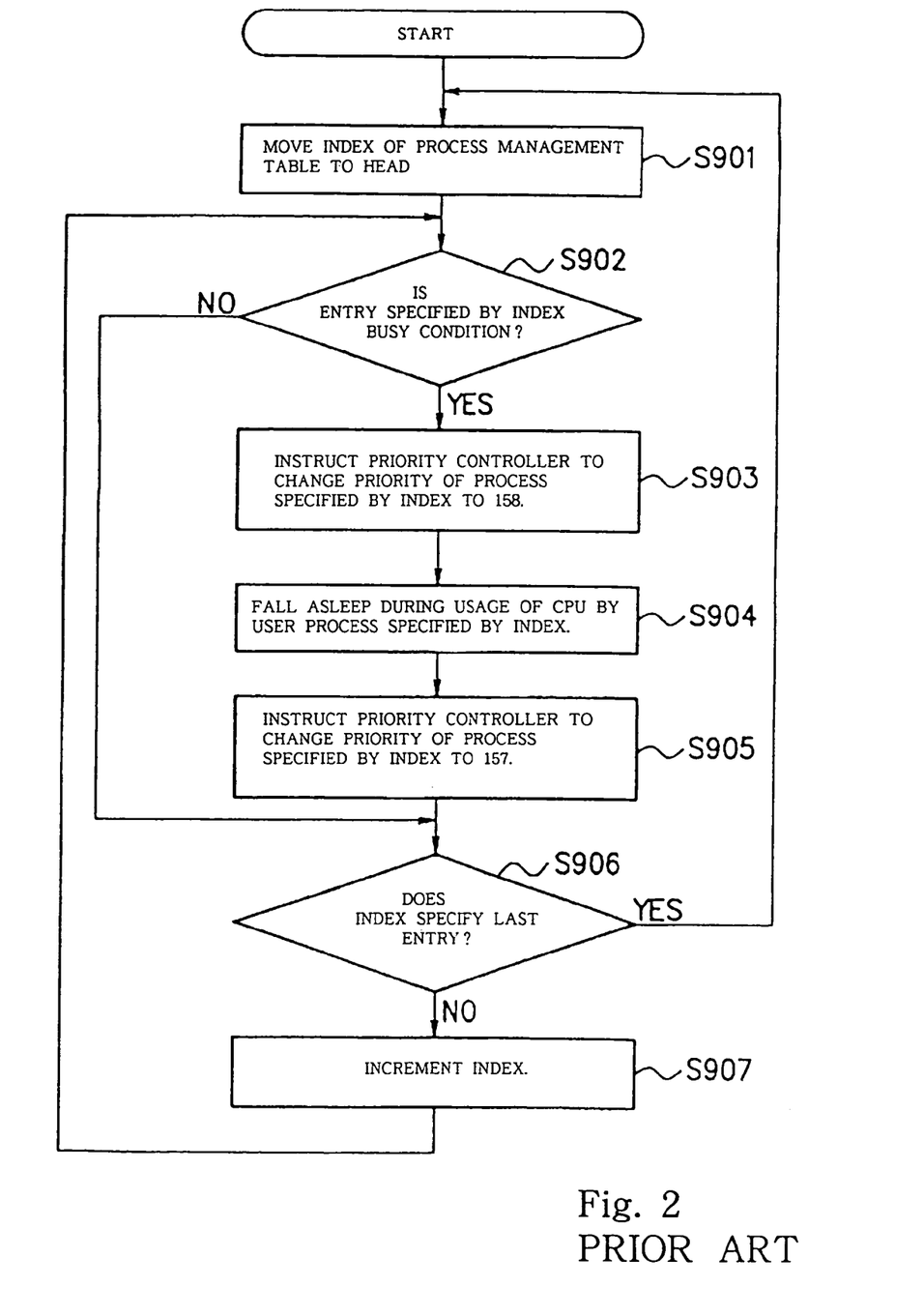
FIG. 2 is a flow chart showing the control sequence for scheduling the processes in the first prior art.

FIG. 1 illustrates the scheme of the first prior art, and FIG. 2 shows the control sequence for scheduling user processes. The first prior art has a user-level process scheduler 810, which is a process to be scheduled by a basic user-level process scheduler originally incorporated in the operating system 814. The user-level process scheduler 810 has the priority higher than other processes to be scheduled by the user-level process scheduler 810. The user-level process scheduler 810 assigns the central processing unit to a process higher in priority than the other processes. Thus, the user-level process scheduler 810 carries out the scheduling with the assistance of the basic user-level process scheduler originally incorporated in the operating system.

A process is assumed to have the priority higher than that of the user-level process scheduler 810. When the control is transferred from the process to the user-level process scheduler 810, the following sequence is traced. When the control is transferred from a process to another process both under the supervision of the user-level process scheduler 810, the following sequence is also traced. The sequence is described in paragraph 0047 of the Japanese Patent Publication of Unexamined Application.

1. Retention of Context of User Process

The context of the user process currently processed is retained.

2. Activation of Basic Process Scheduler

The operating system 814 instructs the basis process scheduler to search other user processes for a user process with the priority next to that of the user process, the context of which is just retained. The user-level process scheduler 810 is assumed to have the priority next to that of the user process. Then, the basic process scheduler selects the user-level process scheduler 810.

3. Return of Context of User-Level Process Scheduler

In order to restart the user-level process scheduler 810, the basic process scheduler of the operating system 814 makes the context thereof return.

4. Activation of User-Level Process Scheduler

The user-level process scheduler 810 selects a user process to be processed (see steps S901, S902, S906 and S907).

5. Request for Changing Priority of User Process (Origination of System Call)

When the user process to be executed is determined, the priority of the user process to be processed is changed to a level higher than that of other user processes but lower than that of the user-level process scheduler 810 (see step S903). As a result, the other user processes are never executed. The priority controller 826 originates a system call for changing the priority given by the operating system 814.

6. Interruption of User-Level Process Scheduler (Originating System Call for Sleep)

In order to transfer the control to the user process selected by the user-level process scheduler 810, the user-level process scheduler 810, which presently has the highest priority, is slept as by step S904. Namely, the execution controller 824 originates a system call for sleep. The operating system 814 realizes the sleep.

7. Retention of Context of User-Level Process Scheduler

When the operating system receives the system call for sleep, the operating system retains the context of the user-level process scheduler 810.

8. Activation of Basic Process Scheduler

The basic process scheduler identifies the user process having the priority next to the user-level process scheduler 810 with the user process selected by the user-level process scheduler 810.

9. Making Context of User Process Return

In order to transfer the control to the user process to be processed, the context of the user process selected by the user-level process scheduler 810 is made return. Then, the control is transferred to the user process selected by the user-level process scheduler 810. After a certain time period, the user-level process scheduler 810 wakes up, and restarts the execution from step S905.

The first problem inherent in the first prior art is long overhead time. This is because of the fact that the user-level process scheduler 810 which is one of the user processes schedules other user processes through the system calls.

The second problem also inherent in the first prior art is a large amount of memory assigned to the user-level process scheduler 810. This is because of the fact that the user-level process scheduler is one of the processes managed by the operating system.

SUMMARY OF THE INVENTION

It is therefore an important object of the present invention to provide a process scheduler, which reduces the overhead time and the amount of memory to be assigned thereto.

It is also an important object of the present invention to provide a scheduling method used in the process scheduler.

In accordance with one aspect of the present invention, there is provided a process scheduling system comprising plural process schedulers respectively associated with plural user process groups each having at least one user process and selectively activated so as to search the associated user process groups for an executable user process, an administrator for managing the plural process schedulers, a process managing section respectively associated with the plural process schedulers for managing the plural user process groups and a selector cooperating with the administrator for selectively activating the plural process schedulers and informed of the executable user process. The process scheduling system may further comprise a process changer associated with the selector and changing a presently processed user process to the executable user process.

In accordance with another aspect of the present invention, there is provided a process for scheduling user processes comprising the steps of retaining a context of presently processed user process, calling a selector into execution, selecting one of process schedulers respectively associated with user process groups each having at least one user process and causing the one of the process schedulers to search the associated user process group for an executable user process. The process may further comprise the step of causing a context of the executable user process for replacing the presently processed user process with the executable user process.

BRIEF DESCRIPTION OF THE DRAWINGS

The features and advantages of the process scheduler and the method will be more clearly understood from the following description taken in conjunction with the accompanying drawings in which.

DESCRIPTION OF THE PREFERRED EMBODIMENTS

First Embodiment

Figure 3:
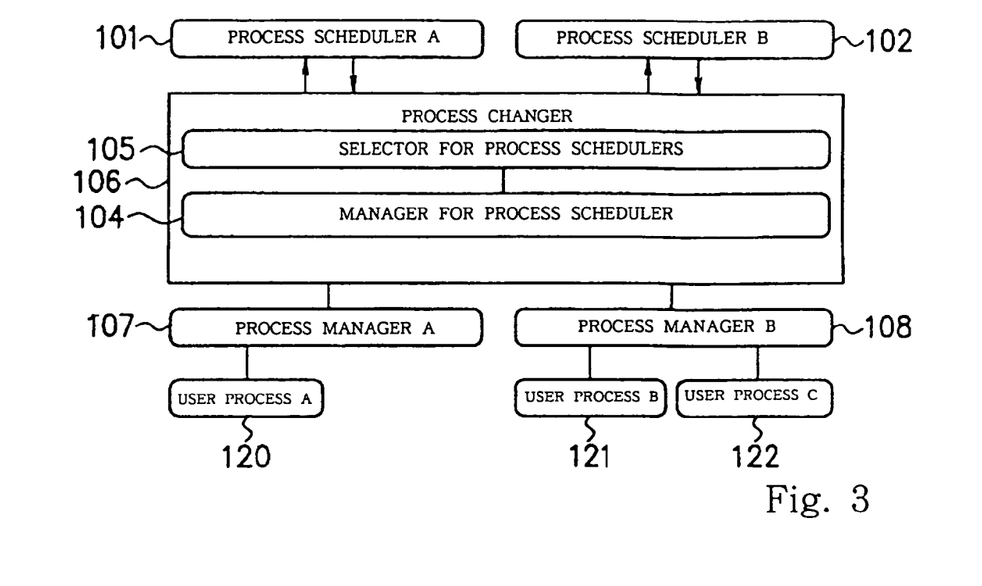
FIG. 3 is a block diagram showing the scheme of a process scheduling system according to the present invention.

Referring first to FIG. 3 of the drawings, a process scheduling system embodying the present invention comprises a process scheduler A 101, a process scheduler B 102, a manager 104 for process schedulers, a selector 105 for process schedulers, a process changer 106, a process manager A 107 and a process manager B 108. The process schedulers 101/102 are respectively associated with the process managers 107/108. Each of the process managers 107/108 supervises plural user processes and the associated process scheduler. A user process A 120 is under the supervision of the process manager A, and user processes B and C 121/122 are under the supervision of the process manager B 108. For this reason, the user process A 120 is to be scheduled by the process scheduler A 101, and the user processes B 121/122 are to be scheduled by the process scheduler B 102.

The manager 104 for process schedulers stores pieces of data information unique to the process schedulers 101/102. A piece of data information is, by way of example, representative of a starting address of a process schedule program to implement an associated one of the process schedulers 101/102. Plural process managers are under the supervision of the manager 104. In this instance, the process manager A 101 and the process manager B 102 are under the supervision of the manager 104. When the user process is to be changed, the selector 105 for process schedulers selects one of the process schedulers 101/102 under the supervision of the manager 104, and the selected process scheduler 101/102 selects a user process to be processed, and executes the process schedule program for the selected user process.

The process manager A 107 is associated with the process scheduler A 101, and supervises the user processes to be scheduled by the process scheduler A 101. The process manager A 107 stores pieces of data information unique to each of the user processes for the supervision. Similarly, the process manager B 108 is associated with the process scheduler B 102, and supervises the user processes to be scheduled by the process scheduler B 102. The process manager B 108 stores pieces of data information unique to each of the user processes for the supervision.

The process scheduler A 101 selects a user process to be processed from the user processes under the supervision of the process manager 107, and notifies the selected user process to the selector 105 for process schedulers. Similarly, the process scheduler B 102 selects a user process to be processed from the user processes under the supervision of the process manager 108, and notifies the selected user process to the selector 105 for process schedulers.

Figure 4:
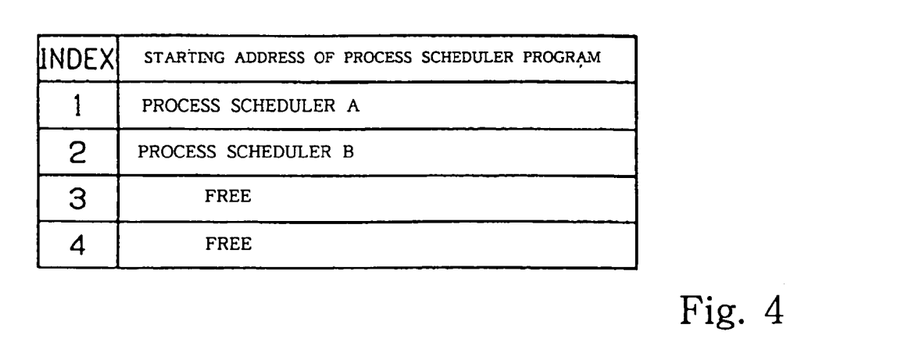
FIG. 4 is a view showing an administrative table stored in a manager for process schedulers.

As described hereinbefore, the manager 104 stores the pieces of data information unique to each of the process schedulers 101/102. In order to supervise the process schedulers 101/102, the manager 104 for process schedulers has an administrative table shown in FIG. 4. The starting addresses of process schedule programs are stored in the administrative table for the process schedulers 101/102, respectively, and indexes 1, 2, . . . are given to the process schedule programs to implement the process schedulers A and B 101/101, respectively. In this instance, two process schedulers A and B are incorporated therein, and, accordingly, only indexes 1 and 2 are valid. Although the administrative table has data storage capacity for more than two process schedulers, pieces of data information representative of unused are stored in the memory locations labeled with indexes 3 and 4.

The selector 105 for process schedulers is associated with the manager 104 for process schedulers, and selects one of the process schedulers 101/102. The selected process scheduler is called by the selector 105. The process schedulers 101/102 notify the user processes to the selector 105, and the se-lector 105 transfers the names of the user processes to the process changer 106. The process changer 106 changes the user process presently processed to the user process notified by the selector 105.

Figure 5A:
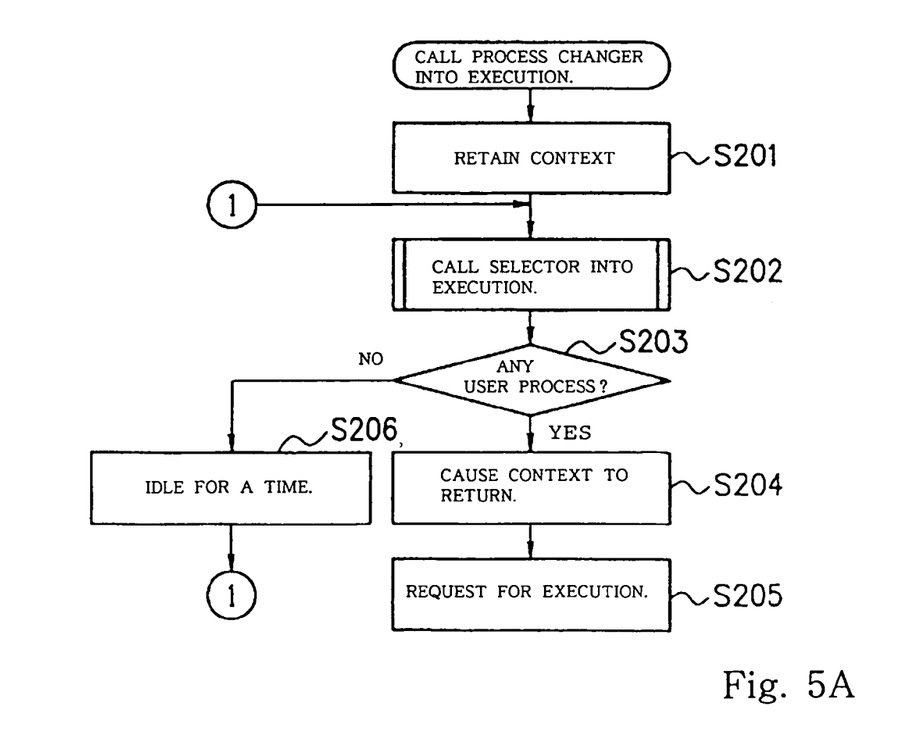
FIGS. 5A and 5B are flowcharts showing behavior of a selector and a process changer both incorporated in the process scheduler.
Figure 5B:
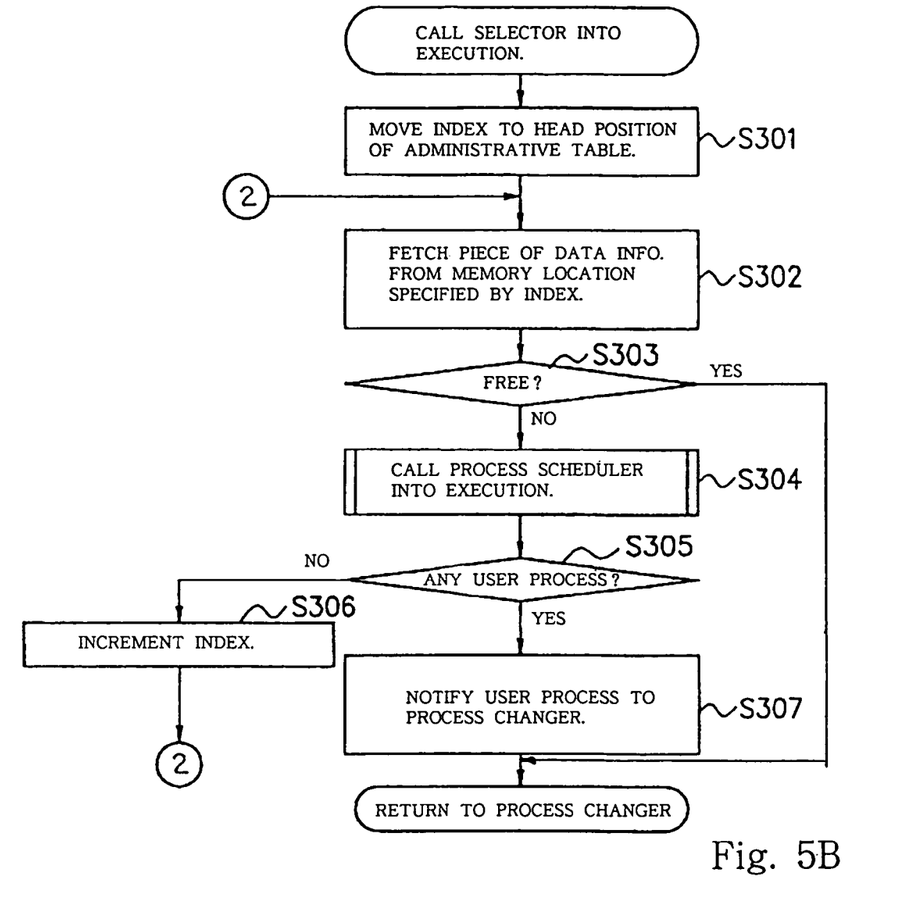

Description is hereinbelow made on the behavior of the process changer and selector 106/105 with reference to FIGS. 5A and 5B.

The process changer 106 behaves as follows. The process changer 106 retains the context of the user process presently processed as by step S201. Upon completion of the retention, the process changer 106 calls the selector 105 into execution as by step S202. The selector 105 behaves as shown in FIG. 5B, and the tasks of the selector 105 will be described hereinbelow in detail.

When the control returns from the selector 105 to the process changer 106, the process changer 106 checks the information storage to see whether or not the selector 105 has already notified a user process to be processed as by step S203. If there is not any user process, the answer at step S203 is given negative, and the process changer 106 idles for a time period as by step S206. Thereafter, the process changer 106 returns to step S202. Thus, the process changer 106 reiterates the loop consisting of steps S201, S202, S203 and S206 until the selector 105 notifies a user process thereto.

When the selector 105 notifies a user process to be processed to the process changer 106, the process changer 106 stores a piece of data information representative of the user process in the information storage thereof. Then, the answer at step S203 is given affirmative, and the process changer 106 proceeds to step S204.

The process changer 106 causes the context of the user process to return at step S204, and originates a request for executing a program for the user process as by step S205. The process changer 106 idles until the next call.

Subsequently, the behavior of the selector 105 at step S202 is described with reference to FIG. 5B. Firstly, the tasks of the process schedulers 101/102 are summarized. The process schedulers A and B 101/102 are supervised by the process managers A and B 107/108, respectively. The process scheduler A and B 101/102 independently schedule processable user processes. Subsequently, each of the process schedulers A and B 101/102 selects one of the user processes, and notifies the selected user process to the selector 105 for process schedulers. If there is not any processable user process, the associated process scheduler A or B 101/102 notifies that all the user process are not processable.

Firstly, the selector 105 moves the index to the head position, i.e., "1" as by step S301. Index "1" is given to the address location to store the piece of data information representative of the starting address of the process schedule program to implement the process scheduler A 101, and the selector 105 fetches the piece of data information from the memory location of the administrative table specified by index "1".

Subsequently, the selector 105 examines the piece of data information to see whether or not the memory location is free as by step S303. If the piece of data information is representative of "free", the answer at step S303 is given affirmative, and the control returns from the selector 105 to the process changer 106.

On the other hand, when the piece of data information is representative of a starting address of a process schedule program, the answer is given negative. The piece of data information specified by index "1" represents the starting address of process schedule program to implement the process scheduler A. Then, the control proceeds to step S304, and the control is branched to the process schedule program to implement the process scheduler A 101.

The process schedule program is called into execution on the basis of the starting address at step S304, and implements the process scheduler A 101. The process scheduler A 101 achieves the tasks described hereinbefore.

Upon completion of the process scheduler program, the process scheduler A 101 transfers the control to the selector 105. The selector 105 checks the information storage thereof to see whether or not the process scheduler 101/102 has notified a user process to be processed as by step S305.

If the selector 305 has not been informed of any user process, the answer at step S305 is given negative, and the selector 105 increments the index by one as by step S306. The selector 105 returns to step S302, and searches the administrative table for fetching the piece of data information from the memory location specified by the index. Thus, the selector 105 reiterates the loop consisting of steps S302 to S306 until the selector finds a user process to be processed.

When the selector 105 has been already informed of a user process, the answer at step S305 is given affirmative, and the selector 105 notifies the user process to the process changer 106 as by step S307. Then, the control is transferred to the process changer 106.

Assuming now that the process managers A and B supervise the user process 120 and the user processes 121/122, respectively, the process changer 106 retains the context of a user process presently processed (see step S201), and calls the selector 105 into execution (see step S202). The selector 105 moves the index to the head position (see step S301), and fetches the piece of data information from the memory location specified by index "1" (see step S302). The piece of data information is representative of the starting address of the program for the process scheduler A 101, and the answer at step S303 is given negative.

Only the user process A 120 is under the supervision of the process scheduler A 101. If the user process A 120 has been scheduled, the process scheduler A 101 notifies the piece of data information representative of the user process A 120 to the selector 105 (see step S304). The control is transferred from the process scheduler A 101 to the selector 105. The answer at step S305 is given affirmative, and the selector 105 notifies the piece of data information representative of the user process A 120 to the process changer 106. The process changer 106 causes the context of the user program A 120 to return, and originates the request for executing the program for the user process A 120. Thus, the user process is changed to A 120.

On the other hand, if the user process A 120 is not scheduled, the process scheduler A 101 does not notify any user process to the selector 105, and the answer at step S305 is given negative. The selector 105 increments the index to "2". The index "2" specifies the second memory location of the administrative table, and the piece of data information represents the starting address of the program for the process scheduler B 102. The program is executed, and the process scheduler B 102 checks the user processes B 121/122 to see whether any one of the user processes B has been scheduled for processing. If the process scheduler B 102 finds a user process B 121 or 122 to be processed, the process scheduler B 102 notifies the piece of data information representative of the user process B 121 or 122 to the selector 105, and the answer at step S 305 is given affirmative. However, if the process scheduler B 102 does not find any user process to be processed, the answer at step S305 is given negative, and the selector 105 increments the index to "3". The index "3" specifies the third memory location of the administrative table. The third memory location is free. Then the answer at step S303 is given affirmative, and the selector 105 transfers the control to the process changer 106.

While the program for the user process A 120 is running, the processing is assumed to be interrupted due to, for example, impossibility to allocate system resources to the user process A 120. The context of the user process A 120 is retained at step S201, and process changer 106 calls the selector 105 into execution at step S202. The selector 105 sequentially checks the process schedulers 101/102 to see whether any user process is ready for processing through the loop consisting of steps S301 to S306. As described hereinbefore, the process scheduler A 101 is firstly called. The process manager A 107 supervises only the user process A 120, and the user process A 120 is to be scheduled by the process scheduler A 101. However, the user process A 120 is not executable. The process scheduler A 120 can not inform the selector 105 of any user process, and the selector 105 decides all the user processes under the supervision of the process scheduler A 101 not to be executable at step S305. Then, the selector 105 increments the index to "2" at step S306, and the process scheduler B 102 is activated through step S302.

The process scheduler B 102 checks the user processes to see whether or not any one of the user processes B 121/122 is ready for processing. The user process B 121 is assumed to have been scheduled. The process scheduler B 102 notifies the executable user process B 121 to the selector 105, and the answer at step S305 is given affirmative. Then, the selector 105 notifies the executable user process B 121 to the process changer 106 at step S307, and the control is transferred from the selector 105 to the process changer 106.

The process changer 106 causes the context of the user process B 121 to return at step S204, and the user process is changed from A 120 to B 121 at step S205.

Second Embodiment

Figure 6:
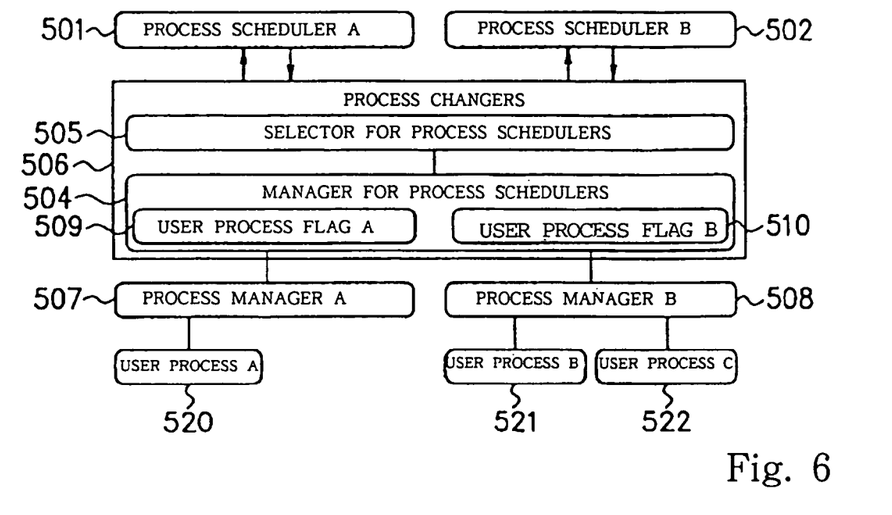
FIG. 6 is a block diagram showing the scheme of another process scheduling system according to the present invention.

Turning to FIG. 6 of the drawings, another process scheduling system embodying the present invention comprises process schedulers A and B 501/502, a manager for process schedulers 504, a selector for process schedulers 505, a process changer 506 and process managers A and B 507/508. In this instance, the process manager A 507 supervises the process scheduler A 501 and the user process A 520, and the other process manager B 508 supervises the process scheduler B 502 and the user processes B and C 521/522. The process changer 506 behaves as similar to the process changer 106, and the flowchart shown in FIG. 5A will be referred to hereinlater.

Figure 7:
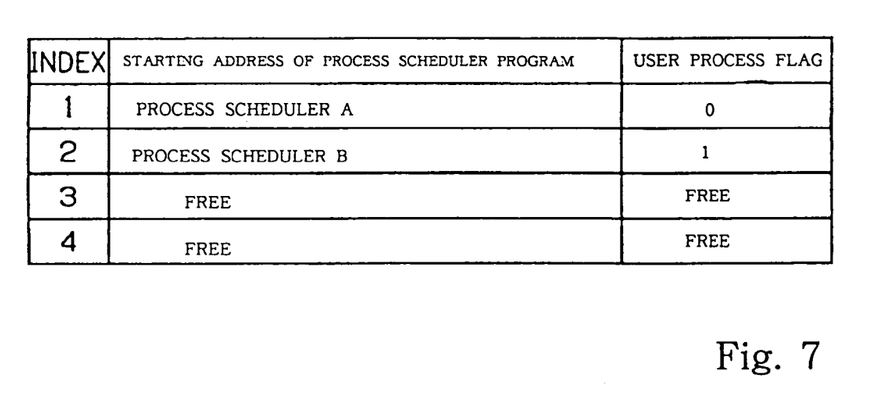
FIG. 7 is a view showing an administrative table incorporated in the process scheduling system.

The manager 505 has an administrative table shown in FIG. 7. Plural memory locations are labeled with indexes "1", "2", "3" and "4", respectively. Each of the memory locations is divided into two sections. A piece of data information is stored in the first section, and is representative of a starting address of process scheduler program. A user process flag is stored in the second section. The user process flag is switched between "0" and "1". When the process manager A or B 507/508 finds at least one of the user processes to be executable, the user process flag is switched from "0" to "1". The user process flag of "0" represents that all the user processes are not executable.

Figure 8:
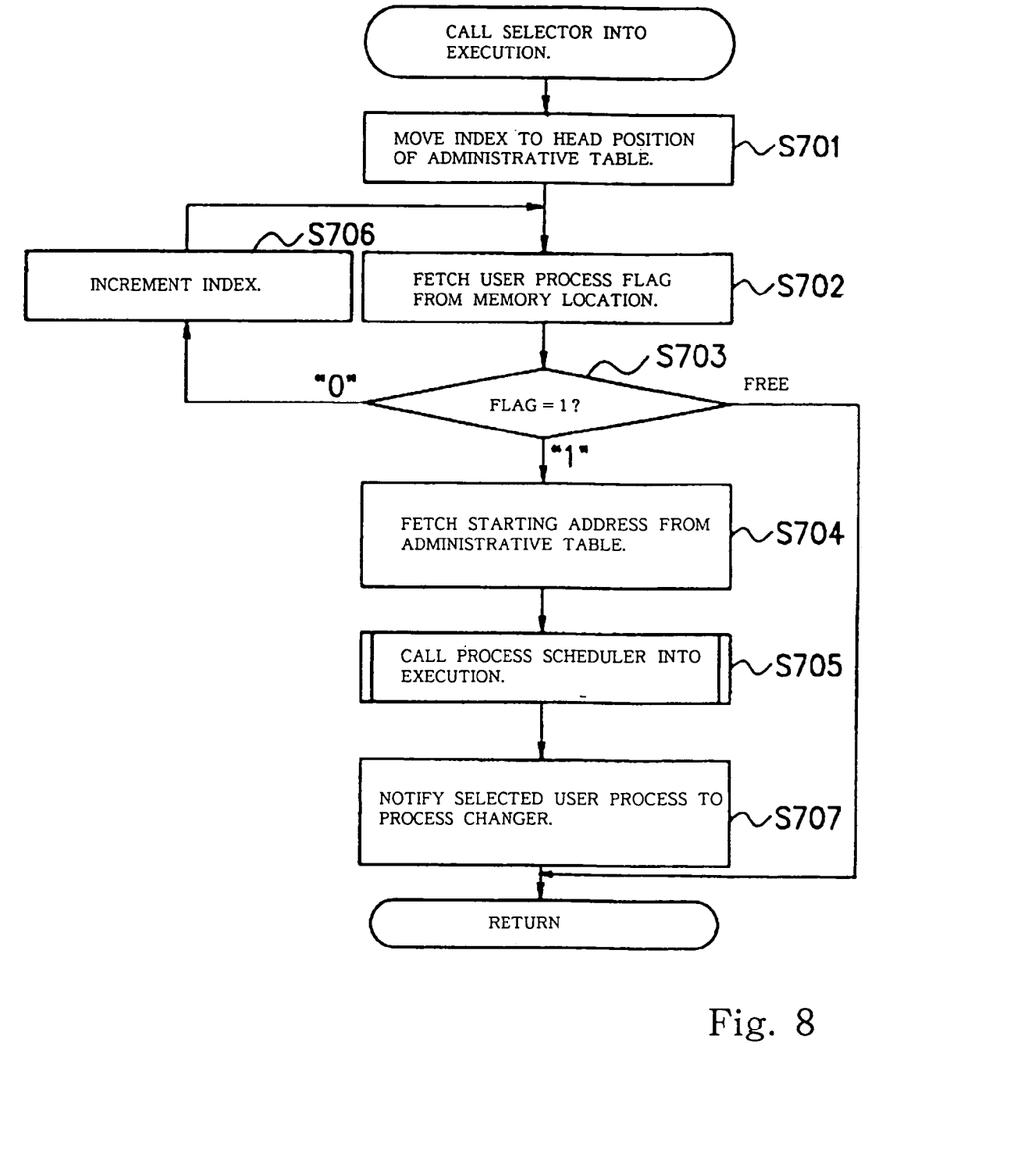
FIG. 8 is a flowchart showing part of behavior of the process scheduling system.

The selector 505 cooperates with the process changer 506 as similar to those of the first embodiment, and selects a process scheduler which has the least index number and the user process flag of "1". FIG. 8 teaches how the selector 505 selects the user process.

The selector 505 firstly moves the index to the head position of the administrative table as by step S701, and fetches the piece of data information representative of the user process flag from the memory location specified by index "1" as by step S702. The selector 505 checks the piece of data information to see whether the user process flag is "0", "1" or "free".

If the flag is "0", the selector 505 increments the index by one as by step S706, and returns to step S702. If the flag is "free", the control is transferred from the selector 505 to the process changer 506. Thus, the selector 505 reiterates the loop consisting of steps S702, S703 and S706.

When the flag is "1", the selector 505 fetches the other piece of data information representative of the starting address as by step S704, and calls the associated process scheduler A or B into execution as by step S705. Namely, the control starts the process scheduler program at the starting address, and implements the process scheduler A or B 501/502.

The process scheduler A or B 501/502 searches the group of associated user processes for an executable user process. When the process scheduler A or B 501/502 finds a user process to be executable, the process scheduler A or B 501/502 notifies a piece of data information representative of the executable user process to the selector 505, and the selector 505 notifies the executable user process to the process changer 606 as by step S707. Thereafter, the control is transferred from the selector 505 to the process changer 506.

While the program for the user process A 520 is running, the processing is assumed to be interrupted due to, for example, impossibility to allocate system resources to the user process A 520. The process changer 506 retains the context of the user process A 520 at step S201, and process changer 506 calls the selector 505 into execution at step S202. The selector 505 sequentially checks the memory locations to see whether any one of the process schedulers 501/502 has the user process flag of "1" through the loop consisting of steps S701 to S703 and S706.

As described hereinbefore, the process scheduler A 501 has the user process flag of "0", and the next process scheduler B 502 has the user process flag of "1". The selector 505 fetches the piece of data information representative of the starting address of the program for the process scheduler B 502. The process manager B 508 is associated with the process scheduler B 502, and supervises the user processes B 521/522. The user process B 521 is to be scheduled by the process scheduler B 502. The process scheduler B 502 supplies the piece of data information representative of the user process B 521 to the selector 505, and the selector 505 notifies the user process B521 to the process changer 506 at step S707.

The control is transferred from the selector 505 to the process changer 506. With the positive answer at step S203, the process changer 506 causes the context of the user process B 521 to return at step S204, and the user process is changed from A 520 to B 521 at step S205.

As will be appreciated from the foregoing description, the process scheduling system does not require any system call for changing the user process, and the overhead is reduced. This is because of the fact that the change of user process is not carried out as a user process under the operating system. Neither administrative area nor stack area is required, and, accordingly, the memory to be required is reduced.

Although particular embodiments of the present invention have been shown and described, it will be apparent to those skilled in the art that various changes and modifications may be made without departing from the spirit and scope of the present invention.

For example, more than two process schedulers may be incorporated in a process scheduling system according to the present invention together with more than two process managers.

What is claimed is:

1. A process scheduling computer system comprising:
   a plurality of independent process schedulers respectively associated with a separate plurality of user process groups each having at least one user process and selectively activated so as to search the associated user process groups for an executable process,
   an administrator for managing said plurality of independent process schedulers, said administrator including an administrative table,
   a process managing section respectively associated with said plurality of independent process schedulers for managing said plurality of user process groups,
   a selector cooperating with said administrator for selectively activating said plurality of independent process schedulers and informing said administrator of said executable user process;
   a process changer associated with said selector for changing a presently processed user process to said executable user process;
   wherein said administrator stores in said administrative table data information respectively unique to said plurality of independent process schedulers;
   wherein said data information representative of starting addresses of programs for implementing said plurality of independent process schedulers, respectively; and
   wherein said selector sequentially increments an index of said administrative table associated with said starting addresses to select said one of said plurality of independent process schedulers and one of said executable user process.

2. The process scheduling system as set forth in claim 1, in which said process managing section has pieces of data information respectively each having at least one sub-piece of data information unique to said at least one user process of one of said user process groups.

* * * * *